(12) United States Patent
Belz et al.

(10) Patent No.: US 9,797,119 B2
(45) Date of Patent: Oct. 24, 2017

(54) FAUCET INCLUDING A CAPACITANCE BASED SENSOR

(71) Applicant: DELTA FAUCET COMPANY, Indianapolis, IN (US)

(72) Inventors: Jeffrey J. Belz, Eastpointe, MI (US); David M. Burke, Taylor, MI (US)

(73) Assignee: Delta Faucet Company, Indianapolis, IN (US)

( * ) Notice: Subject to any disclaimer, the term of this patent is extended or adjusted under 35 U.S.C. 154(b) by 107 days.

(21) Appl. No.: 14/942,271

(22) Filed: Nov. 16, 2015

(65) Prior Publication Data

US 2016/0069053 A1   Mar. 10, 2016
US 2017/0096802 A9   Apr. 6, 2017

Related U.S. Application Data

(62) Division of application No. 13/224,982, filed on Sep. 2, 2011, now Pat. No. 9,187,884.

(60) Provisional application No. 61/381,045, filed on Sep. 8, 2010.

(51) Int. Cl.
*E03C 1/05* (2006.01)
*E03C 1/04* (2006.01)
*F16K 31/06* (2006.01)
*E03C 1/02* (2006.01)

(52) U.S. Cl.
CPC ............. *E03C 1/057* (2013.01); *E03C 1/04* (2013.01); *F16K 31/0644* (2013.01); *E03C 2001/026* (2013.01); *Y10T 137/0318* (2015.04)

(58) Field of Classification Search
CPC ...... E03C 1/057; E03C 1/04; E03C 2001/026; E03C 1/05; E03C 1/0401; E03C 1/0404; F16K 31/0644; F16K 31/02; Y10T 137/0318; A47K 2005/1218
USPC ...... 251/129.01, 129.03–129.04; 4/623, 619; 137/1, 801
See application file for complete search history.

(56) References Cited

U.S. PATENT DOCUMENTS

| | | | |
|---|---|---|---|
| 2,501,583 A | 3/1950 | Schafer |
| 3,151,340 A | 10/1964 | Teshima |
| 3,588,038 A | 6/1971 | Tanaka |
| 4,839,039 A | 6/1989 | Parsons et al. |
| 4,872,485 A | 10/1989 | Laverty, Jr. |
| 5,184,642 A | 2/1993 | Powell |
| 5,322,086 A | 6/1994 | Sullivan |
| 5,730,165 A | 3/1998 | Philipp |
| 6,215,116 B1 | 4/2001 | Van Marcke |
| 6,619,320 B2 | 9/2003 | Parsons |
| 6,962,168 B2 | 11/2005 | McDaniel et al. |
| 6,968,860 B1 | 11/2005 | Haenlein et al. |
| 7,150,293 B2 | 12/2006 | Jonte |
| 7,232,111 B2 | 6/2007 | McDaniel et al. |

(Continued)

FOREIGN PATENT DOCUMENTS

| | | |
|---|---|---|
| CA | 2725975 | 6/2011 |
| CA | 2726057 | 6/2011 |

(Continued)

*Primary Examiner* — John Bastianelli
(74) *Attorney, Agent, or Firm* — Faegre Baker Daniels LLP (57) ABSTRACT

An electronic faucet is provided that includes a spout having a passageway configured to conduct fluid flow through the spout, an electrically operable valve coupled to the passageway, and a capacitive sensor coupled to the faucet. A controller may dynamically change on/off thresholds and monitor a stability signal to determine when to turn off the electrically operable valve.

16 Claims, 6 Drawing Sheets

(56) References Cited

U.S. PATENT DOCUMENTS

| | | |
|---|---|---|
| 7,458,520 B2 | 12/2008 | Belz et al. |
| 7,516,939 B2 | 4/2009 | Bailey |
| 7,522,878 B2 | 4/2009 | Baarman |
| 7,537,023 B2 | 5/2009 | Marty et al. |
| 7,537,195 B2 | 5/2009 | McDaniel et al. |
| 7,651,068 B2 | 1/2010 | Bailey |
| 7,690,395 B2 | 4/2010 | Jonte et al. |
| 7,806,141 B2 | 10/2010 | Marty et al. |
| 7,997,301 B2 | 8/2011 | Marty et al. |
| 8,028,355 B2 | 10/2011 | Reeder et al. |
| 2005/0150556 A1 | 7/2005 | Jonte |
| 2005/0150557 A1 | 7/2005 | McDaniel et al. |
| 2005/0151101 A1 | 7/2005 | McDaniel et al. |
| 2006/0124883 A1 | 6/2006 | Bailey |
| 2006/0130907 A1 | 6/2006 | Marty et al. |
| 2006/0130908 A1 | 6/2006 | Marty et al. |
| 2006/0200903 A1 | 9/2006 | Rodenbeck et al. |
| 2007/0069168 A1 | 3/2007 | Jonte |
| 2007/0157978 A1 | 7/2007 | Jonte et al. |
| 2007/0235672 A1 | 10/2007 | McDaniel et al. |
| 2007/0246267 A1 | 10/2007 | Koottungal |
| 2007/0246550 A1 | 10/2007 | Rodenbeck et al. |
| 2007/0246564 A1 | 10/2007 | Rodenbeck et al. |
| 2008/0178950 A1 | 7/2008 | Marty et al. |
| 2008/0271238 A1 | 11/2008 | Reeder et al. |
| 2009/0039176 A1 | 2/2009 | Davidson et al. |
| 2009/0160659 A1 | 6/2009 | Bailey |
| 2010/0012194 A1 | 1/2010 | Jonte et al. |
| 2010/0044604 A1 | 2/2010 | Burke et al. |
| 2010/0096017 A1 | 4/2010 | Jonte et al. |
| 2010/0108165 A1 | 5/2010 | Rodenbeck et al. |
| 2010/0170570 A1 | 7/2010 | Rodenbeck et al. |
| 2011/0016625 A1 | 1/2011 | Marty et al. |
| 2011/0155251 A1 | 6/2011 | Jonte et al. |
| 2011/0155894 A1 | 6/2011 | Davidson et al. |
| 2011/0155932 A1 | 6/2011 | Jonte et al. |
| 2011/0253220 A1 | 10/2011 | Sawaski et al. |

FOREIGN PATENT DOCUMENTS

| | | |
|---|---|---|
| CA | 2726089 | 6/2011 |
| WO | WO 2006/098795 | 9/2006 |
| WO | WO 2007/059051 | 5/2007 |
| WO | WO 2007/082301 | 7/2007 |
| WO | WO 2007/124311 | 11/2007 |
| WO | WO 2007/124438 | 11/2007 |
| WO | WO 2008/118402 | 1/2008 |
| WO | WO 2008/088534 | 7/2008 |
| WO | WO 2008/094246 | 8/2008 |
| WO | WO 2008/094247 | 8/2008 |
| WO | WO 2008/094651 | 8/2008 |
| WO | WO 2009/075858 | 6/2009 |

# FAUCET INCLUDING A CAPACITANCE BASED SENSOR

CROSS-REFERENCE TO RELATED APPLICATION

The present application is a divisional of U.S. patent application Ser. No. 13/224,982, filed Sep. 2, 2011, which claims priority to U.S. Provisional Patent Application Ser. No. 61/381,045, filed Sep. 8, 2010, entitled "FAUCET INCLUDING A CAPACITANCE BASED SENSOR," the disclosures of which are expressly incorporated by reference herein.

BACKGROUND AND SUMMARY

The present disclosure relates generally to electronic faucets. More particularly, the present disclosure relates to capacitive sensing systems and methods for operating a faucet.

Electronic faucets are often used to control fluid flow. Some electronic faucets include proximity sensors such as active infrared ("IR") proximity detectors or capacitive proximity sensors to control operation of the faucet. Such proximity sensors are used to detect a user's hands positioned near the faucet and to automatically start fluid flow through the faucet in response to detection of the user's hands. Other electronic faucets use touch sensors to control the faucet. Such touch sensors may include capacitive touch sensors or other types of touch sensors located on a spout or on a handle of the faucet for controlling operation of the faucet. Electronic faucets may also include separate touch and proximity sensors.

The present disclosure relates to a faucet including a capacitance based sensor. Capacitance by nature changes due to environmental factors of the faucet system, including installation, water conductivity, and age. For example, capacitance readings may change based upon the location of conductive items (such as soap dishes, cleaning utensils, toiletry items, and cooking items, for example) near the faucet and/or deposits (such as minerals or soap scum, for example) on the faucet itself. The changes in capacitance due to environmental factors may cause operational problems, such as causing the faucet to not turn on, to stay on, or to oscillate between off and on, for example.

In one embodiment, the system of the present disclosure is configured to provide consistent and reliable on/off control of the faucet throughout the life of the product.

According to an illustrative embodiment of the present disclosure, the system includes a controller configured to dynamically change the on/off thresholds of the faucet to account for capacitance changes due to environmental factors and to monitor signal stability to determine when to turn on and when to turn off the faucet.

According to another illustrative embodiment of the present disclosure, the system deviates from the conventional method of on/off control. A conventional method may include fixed thresholds, one threshold for turning the faucet off and another threshold for turning the faucet on. An illustrative system of the present disclosure changes these thresholds dynamically and uses the stability of the signal to determine when to turn off the faucet.

According to an illustrative embodiment of the present disclosure, an electronic faucet is provided comprising a spout having a passageway configured to deliver fluid through the spout. The faucet further includes an electrically operable valve positioned in the passageway and a capacitive sensor coupled to the faucet. A controller is in electrical communication with the capacitive sensor and defines a threshold. The capacitive sensor is configured to send a signal to the controller. The controller is configured to open the valve when a measure of the signal reaches the threshold and to adjust the threshold in response to at least one environmental factor.

According to another illustrative embodiment of the present disclosure, an electronic faucet is provided comprising a spout having a passageway configured to deliver fluid through the spout. The faucet further includes an electrically operable valve positioned in the passageway and a capacitive sensor coupled to the faucet and defining a detection area. A controller is in electrical communication with the capacitive sensor. The controller is configured to maintain the valve in an open position when an object is moving within the detection area.

According to yet another illustrative embodiment of the present disclosure, a method of controlling an electronic faucet is provided. The method includes the step of providing a faucet including a spout having a passageway configured to deliver fluid through the spout. A valve is positioned in the passageway, and a capacitive sensor is coupled to the faucet. The method includes the steps of detecting a signal provided with the capacitive sensor and comparing a measure of the signal with a threshold. The method further includes the steps of opening the valve when the measure of the signal reaches the threshold, and adjusting the threshold in response to at least one environmental factor.

According to still another illustrative embodiment of the present disclosure, a method of controlling an electronic faucet is provided. The method includes the step of providing a faucet including a spout having a passageway configured to deliver fluid through the spout. A valve is positioned in the passageway, and a sensor is coupled to the faucet. The sensor defines a detection area. The method includes the steps of positioning the valve in an open position and detecting movement of an object in the detection area based on a signal provided with the sensor. The method further includes the step of maintaining the valve in the open position when the movement of the object is detected in the detection area.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

For the purposes of promoting an understanding of the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of the principles of the invention which would normally occur to one skilled in the art to which the invention relates.

Figure 1:
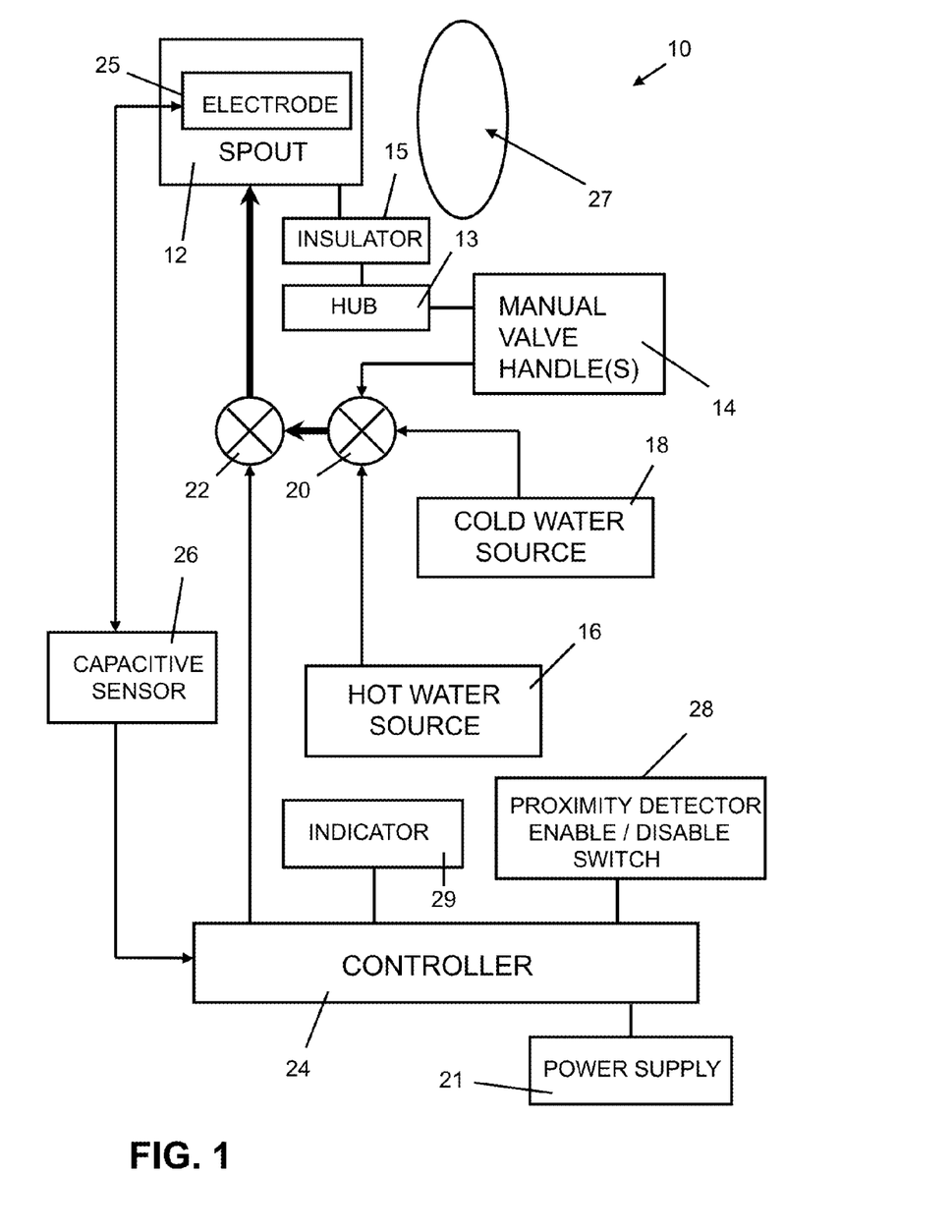
FIG. 1 is a block diagram illustrating an exemplary electronic faucet including a capacitive sensor.

Referring to FIG. 1, a block diagram of an electronic faucet system 10 is illustrated according to one embodiment of the present disclosure. The electronic faucet system 10 includes a spout 12 having a passageway for delivering fluids such as water, for example, and at least one manual valve handle 14 for controlling the flow of fluid through the passageway of spout 12. A valve body assembly 20 is positioned in the passageway of spout 12 and is coupled to a hot water source 16 and a cold water source 18. In the illustrated embodiment, the passageway of spout 12 includes all fluid passages between the hot and cold water sources 16, 18 and the output of spout 12. Manual valve handle 14 manipulates valve body assembly 20 to control the flow of fluid from the hot and cold water sources 16, 18 through valve body assembly 20. In one illustrated embodiment, a separate manual valve handle 14 is provided for each of the hot and cold water sources 16, 18. In other embodiments, such as a faucet system 10 for a kitchen, for example, a single manual valve handle 14 is used for both hot and cold water delivery. In one kitchen embodiment, manual valve handle 14 and spout 12 are coupled to a basin through a single hole mount.

As illustrated in FIG. 1, an output of valve body assembly 20 is coupled to an actuator driven valve 22 which is controlled electronically by input signals provided by a controller 24. As such, manual valve handle 14 controls the fluid flowing from the hot and cold water sources 16, 18 to the input of actuator driven valve 22, and controller 24 controls the fluid flowing from the input of actuator driven valve 22 to spout 12. In the illustrated embodiment, controller 24 is configured to open and close valve 22 to turn on and off the fluid flow between valve body assembly 20 and spout 12. In another embodiment, controller 24 is further configured to proportionally control valve 22 to adjust the flow rate of the fluid flowing to spout 12. In an illustrative embodiment, actuator driven valve 22 is an electrically operable valve, such as a solenoid valve, and more particularly a magnetically latching pilot-controlled solenoid valve, for example.

As illustrated in FIG. 1, controller 24 is coupled to and powered by a power supply 21. In one embodiment, power supply 21 is a building power supply and/or a battery power supply. Controller 24 includes software stored in a memory and containing instructions for controlling valve 22.

In an alternative embodiment, hot water source 16 and cold water source 18 are connected directly to actuator driven valve 22 to provide a fully automatic faucet without any manual controls. In yet another embodiment, controller 24 further controls an electronic proportioning or mixing valve (not shown) coupled to the hot and cold water sources 16, 18 to supply fluid to spout 12 from hot and cold water sources 16, 18. Similar to valve body assembly 20, the electronic proportioning valve, coupled between valve 22 and the hot and cold water sources 16, 18, is adjusted to control the mixture of hot and cold water and thus the temperature of the water flowing through spout 12. Faucet system 10 may further include a temperature sensor in fluid communication with the output of the proportioning valve to provide feedback to controller 24 for use in controlling the water temperature.

Because actuator driven valve 22 is controlled electronically by controller 24, the flow of water can be controlled using an output from a sensor, such as a proximity sensor and/or a touch sensor, for example. In the illustrated embodiment, a capacitive sensor 26 is in communication with controller 24 for providing signals to controller 24 indicating the detection of an object (e.g. a user's hands) near or on spout 12. Other suitable sensors may be provided for detecting an object near faucet 10. As illustrated, an electrode 25 of capacitive sensor 26 is coupled to spout 12, and an output from capacitive sensor 26 is coupled to controller 24. Electrode 25 may be positioned in other suitable areas of faucet system 10 for detecting the presence of a user's hands. In the illustrative embodiment, capacitive sensor 26 and electrode 25 are used for both touch and hands free operation. In the hands free mode of operation, capacitive sensor 26 and controller 24 detect a user's hands or other object within a detection area 27 located near spout 12. In one embodiment, detection area 27 includes the water stream and the area immediately surrounding the water stream. Detection area 27 may be expanded to other areas depending on the location and sensitivity of capacitive sensor 26. In the touch mode of operation, capacitive sensor 26 and controller 24 detect a user's hands or other object upon contact with a surface of spout 12. Capacitive sensor 26 may alternatively operate solely as a touch sensor or a proximity sensor. An exemplary capacitive sensor 26 is a CapSense capacitive sensor available from Cypress Semiconductor Corporation, although other suitable capacitive sensors may be used.

In the illustrative embodiment of FIG. 1, with actuator driven valve 22 opened, faucet system 10 is operated in a conventional manner, i.e., in a manual control mode through operation of handle(s) 14 and the manual valve member(s) of valve body assembly 20. Conversely, with actuator driven valve 22 closed and the manually-controlled valve body assembly 20 set to select a water temperature and flow rate, the fluid flow is blocked with valve 22. To turn on the faucet assembly 10, actuator driven valve 22 is activated by controller 24 when a proximity sensor, such as capacitive sensor 26, detects an object (such as a user's hands) within detection zone or area 27 to thereby toggle water flow on and off. Alternatively or additionally, actuator driven valve 22 may be touch controlled using a touch sensor, such as capacitive sensor 26, to toggle water flow on and off. Further manual adjustment of the water temperature and flow rate may be provided after opening the actuator driven valve 22 by manipulating handle 14.

In one embodiment, controller 24 converts the output of capacitive sensor 26 into a count value. In the illustrated embodiment, an increased capacitance detected with sensor 26 results in an increased count value, and a decreased capacitance detected with sensor 26 results in a decreased count value. See, for example, sensor output signal 302 illustrated in FIG. 4 and described herein.

As described herein, the output signal from capacitive sensor 26 is illustratively used to control actuator driven valve 22 which thereby controls the flow of water to the spout 12 from the hot and cold water sources 16 and 18. By sensing capacitance changes with capacitive sensor 26, controller 24 is configured to make logical decisions to control different modes of operation of system 10 such as changing between a manual mode of operation and a hands free mode of operation as described in U.S. Pat. No. 7,537,023; U.S. Pat. No. 7,690,395; U.S. Pat. No. 7,150,293; U.S. Pat. No. 7,997,301; and PCT International Publication Nos. WO 2008/094651 and WO 2009/075858, the disclosures of which are all expressly incorporated herein by reference.

The amount of fluid flowing from hot water source 16 and cold water source 18 is determined based on one or more user inputs, such as desired fluid temperature, desired fluid flow rate, desired fluid volume, various task based inputs, various recognized presentments, and/or combinations thereof. As described herein, the control of fluid may be provided manually with manual valve handle 14 or electronically with controller 24. As discussed herein, the system 10 may include an electronically controlled mixing valve that is in fluid communication with both hot water source 16 and cold water source 18 and is controlled with controller 24. Exemplary electronically controlled mixing valves are described in U.S. Pat. No. 7,458,520 and PCT International Application Serial No. PCT/US2007/060512, the disclosures of which are expressly incorporated by reference herein. In one embodiment, both manual valve handle 14 and controller 24 may be configured to control the mixing valve. Exemplary user inputs for controlling fluid flow include the position of manual valve handle 14, sensor feedback (e.g. temperature, flow rate, flow volume, etc.), and other suitable inputs.

In an illustrative embodiment, an operator of the electronic faucet 10 can selectively enable or disable the proximity detector (e.g. capacitive sensor 26) using a mode selector switch 28 coupled to controller 24. Upon disabling the proximity detector, the hands free and/or touch mode of faucet assembly 10 is disabled, and actuator driven valve 22 is opened to allow full control with manual handle 14. An exemplary mode selector switch 28 includes a pushbutton, a toggle switch, or another suitable user input. In one embodiment, faucet 10 includes an indicator 29 controlled by controller 24 to provide a visual or audio indication when the electronic faucet 10 is in the hands free and/or touch mode. An exemplary indicator 29 includes an LED or other light source or audible device positioned near faucet assembly 10.

In one embodiment, the hands free/touch mode is also configured to be enabled or disabled using a series of touches of spout 12 and/or handle 14. In the illustrated embodiment, spout 12 is coupled to a faucet body hub 13 through an insulator 15. In one embodiment, faucet body hub 13 is electrically coupled to manual valve handle 14. Therefore, insulator 15 electrically isolates spout 12 from faucet body hub 13 and handle 14. In this illustrated embodiment, electrode 25 is directly coupled to spout 12 and capacitively coupled to handle 14 so that capacitive sensor 26 and controller 24 may determine whether the spout 12 or manual valve handle 14 is touched by a user based on the difference in the capacitance level of sensor 26 as illustrated, for example, in PCT International Publication No. WO2008/088534, the disclosure of which is incorporated herein by reference. As such, controller 24 may be programmed to disable or enable the hands free and touch mode, or to switch between the hands free mode and the touch mode, based on the number, duration, and/or location of touches applied to spout 12 and handle 14.

Figure 2:
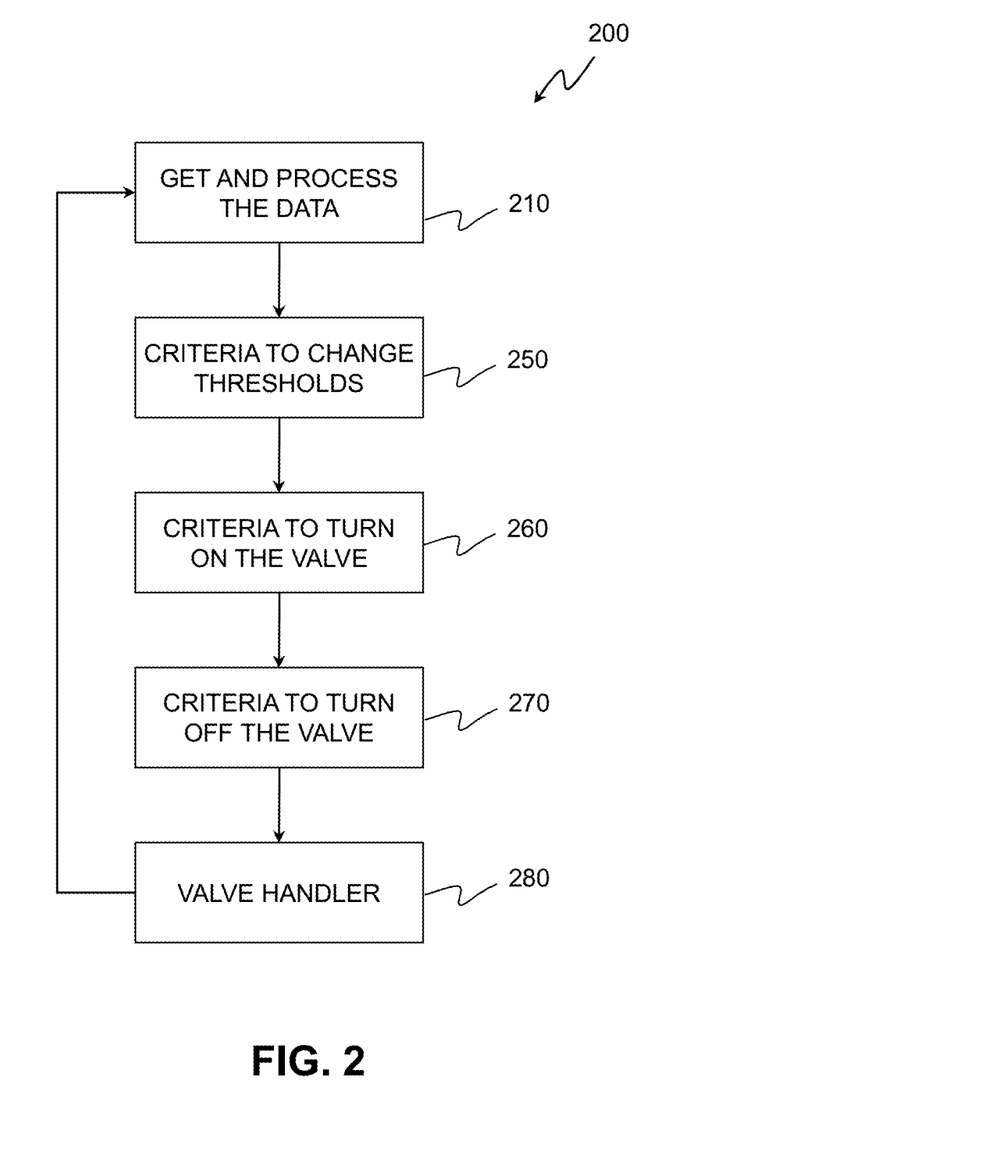
FIG. 2 is a flowchart illustrating an exemplary operation of a capacitive sensing system and method.
Figure 3A:
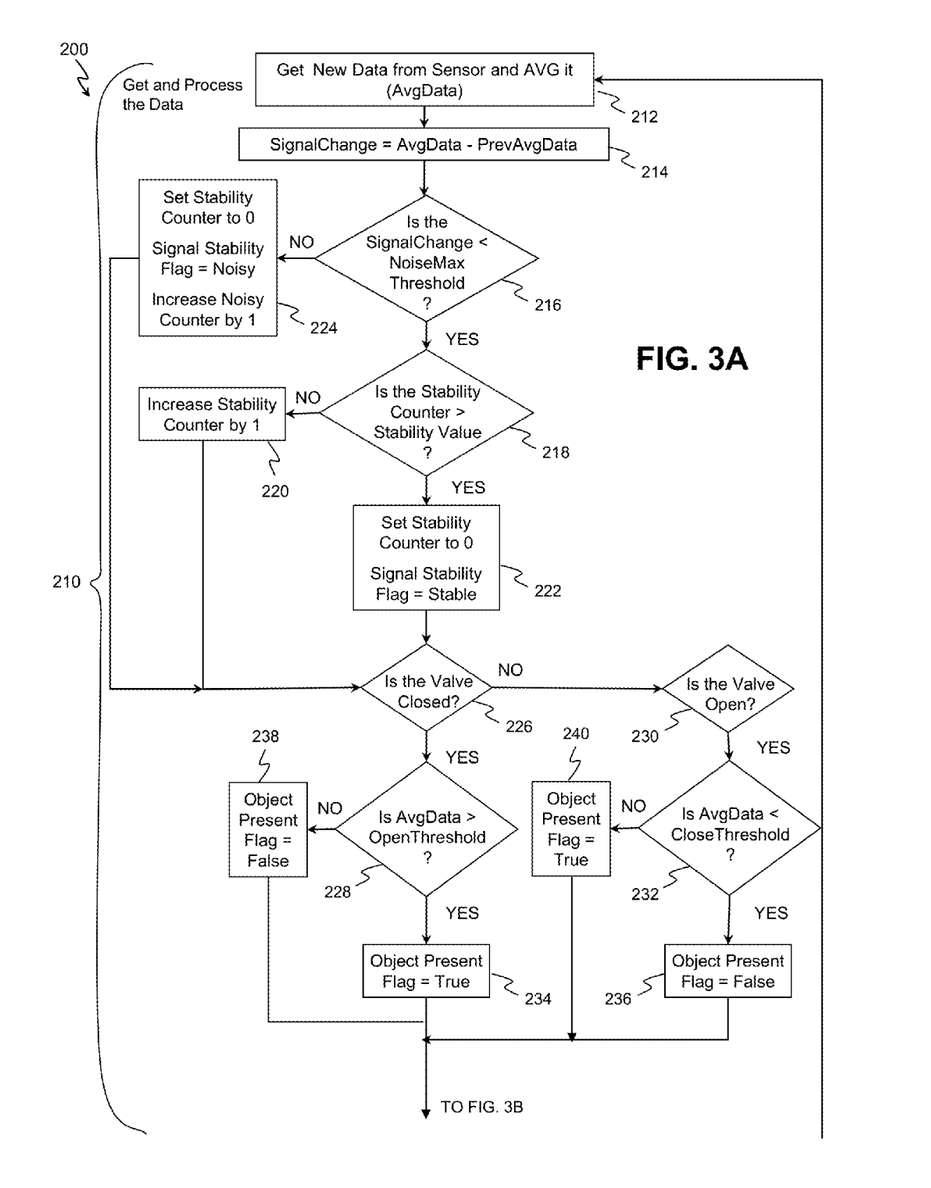
FIGS. 3A, 3B, and 3C are flowcharts illustrating the detailed operation of the capacitive sensing system and method of FIG. 2.
Figure 3B:
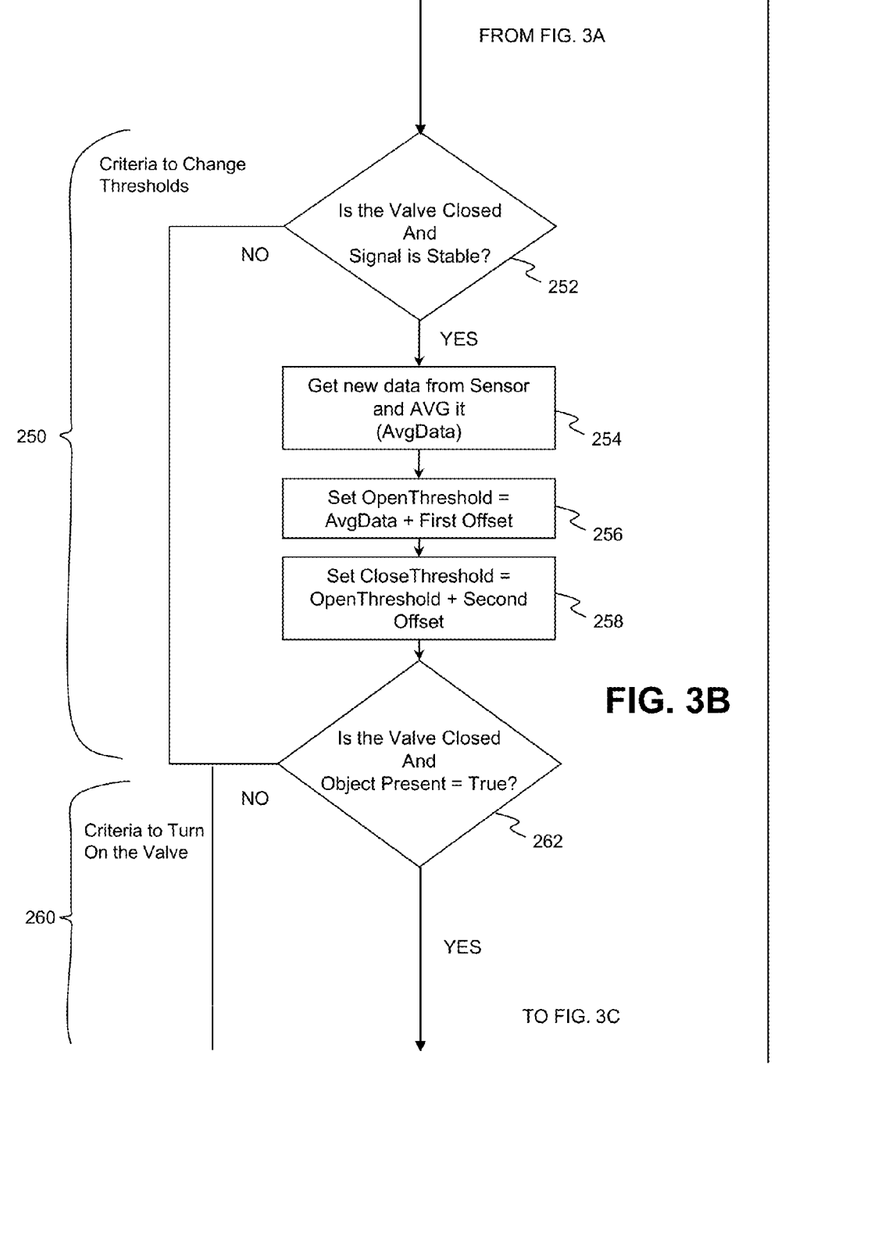
Figure 3C:
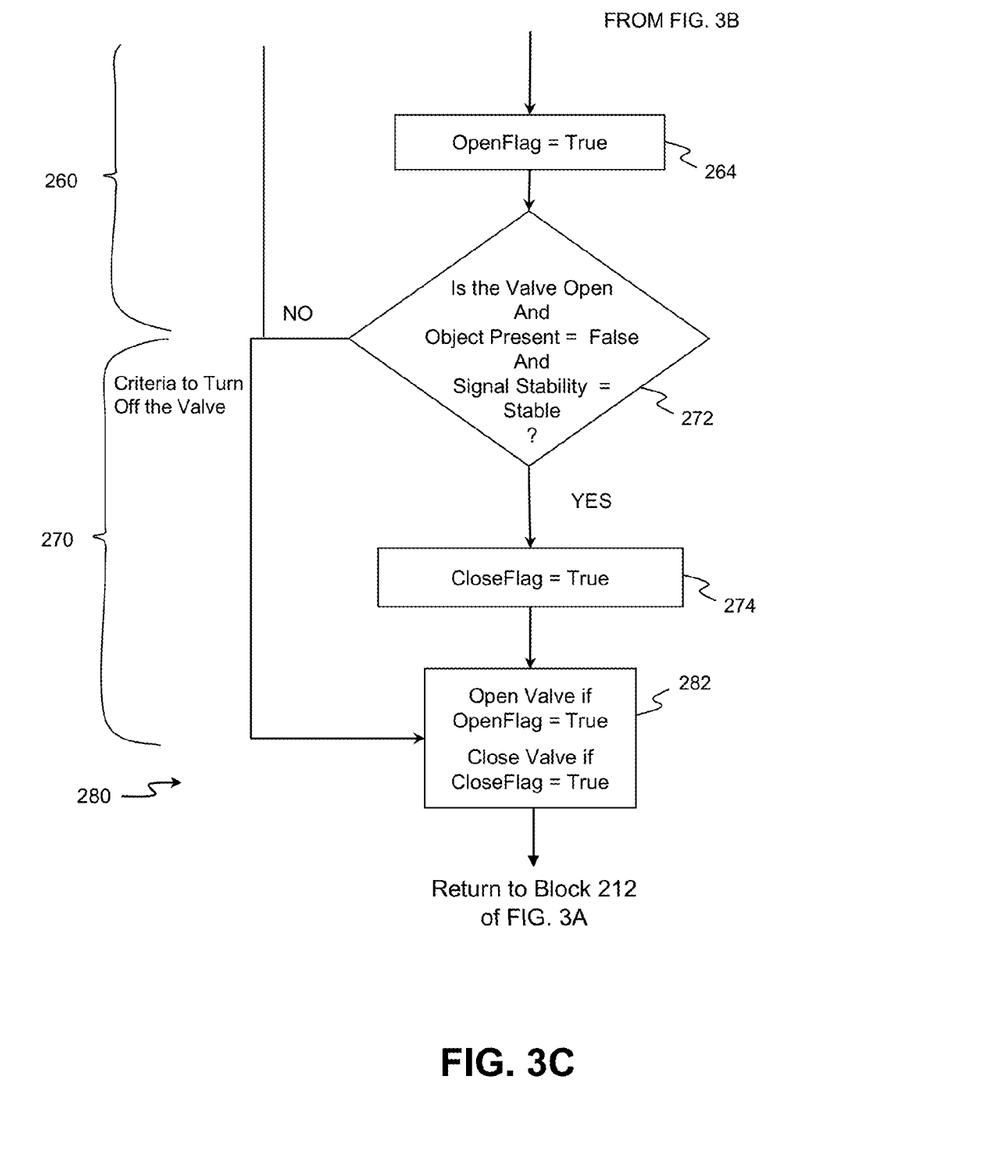

An illustrative embodiment of the hands free/touch mode of operation is method 200 illustrated in FIGS. 2-3C. FIG. 2 illustrates the major components or sub-routines of the method 200, including functional blocks 210, 250, 260, 270, and 280. FIGS. 3A-3C illustrate the steps of each sub-routine of FIG. 2. Reference is made to faucet assembly 10 of FIG. 1 throughout the description of FIGS. 2-3C. As described herein, method 200 illustratively adapts operation of faucet assembly 10 by automatically adjusting appropriate on/off thresholds of valve 22 to account for variations in environmental factors. Method 200 further permits continuous water flow as long as an object is detected within detection area 27, such as in the water stream, of faucet assembly 10.

With further reference to FIGS. 2 and 3A, the illustrative method 200 begins at the Get and Process Data functional block 210 where controller 24 illustratively executes an algorithm provided in software stored in the memory of controller 24. As described herein, in the Get and Process Data functional block 210 controller 24 determines the stability of the signal from capacitance sensor 26 and detects the presence of an object (i.e., the user's hands) in the detection area 27 (FIG. 1) or water stream.

At Block 212 of FIG. 3A, controller 24 grabs new data, i.e., a new measurement/sample, from capacitance sensor 26. In the illustrated embodiment, the data acquired from sensor 26 at Block 212 is a count value that is proportional to the detected capacitance, as described herein. The new data from sensor 26 is averaged with previously acquired data from sensor 26 to generate a rolling average of data from sensor 26 (AvgData). In one embodiment, the previously acquired data is the immediately preceding measurement/sample from sensor 26. Alternatively, the previously acquired data may be several preceding measurements/samples from sensor 26. The new data from sensor 26 and the current rolling average AvgData is stored in the memory of controller 24. At Block 214, controller 24 subtracts the previously calculated average data (PrevAvgData) from the new average data (AvgData). PrevAvgData is illustratively the calculated rolling average from the previous execution of method 200. For example, PrevAvgData is the average of the previous two or more samples acquired from sensor 26 prior to acquiring the new data from sensor 26 at Block 212. The calculated difference (SignalChange) at Block 214 is a measure of how much the signal from sensor 26, illustratively the measured capacitance, has changed from one sample to another.

If the change or variation of the signal from sensor 26 falls within a predetermined "noise" range or threshold, a Stability Counter is incremented by controller 24. The Stability Counter counts the number of consecutive instances that the difference between the previous two rolling average measurements (PrevAvgData and AvgData) falls within the predefined noise threshold or range. If the Stability Counter reaches a predetermined value during the execution of method 200, controller 24 determines that the signal from sensor 26 is "stable." A "stable" signal from sensor 26 illustratively indicates that little or no motion of a user's hands or other object has been detected by sensor 26.

Referring to FIG. 3A, at decision Block 216 the controller 24 determines if the calculated signal change (SignalChange) is less than a signal noise limit (NoiseMaxThreshold). Signal noise is generated, for example, by the motion of a user's hands in proximity to capacitive sensor 26 (for example, in detection area 27 or the water stream of the faucet). In one illustrative embodiment, the noise limit is predefined as a 20 percent change in the signal value from sensor 26, although other suitable percent changes could be used to define the noise limit. If the signal change (SignalChange) is less than the noise limit (NoiseMaxThreshold), controller 24 determines at Block 218 if the Stability Counter is greater than a predetermined value (Stability Value). In the illustrated embodiment, the Stability Value is a predetermined counter value equal to the number of SignalChange calculations that are performed by controller 24 in about one second of elapsed time. In other words, the Stability Value is illustratively equal to the number of iterations of method 200 that are performed in about one second. As such, when the Stability Counter exceeds the Stability Value (i.e., when the signal change is less than the noise limit for about one second), the signal from sensor 26 is determined to be stable, thereby indicating that minimal or no motion is detected in detection zone 27. Other suitable values for the Stability Value may be used. For example, the Stability Value may correspond to the number of iterations of method 200 that are performed in about three seconds, five seconds, ten seconds, or other suitable periods for determining that the capacitive signal is stable. As described herein, a determination by controller 24 of a "stable" signal from sensor 26 is configured to close valve 22 under some operating conditions.

If the Stability Counter is not greater than the Stability Value at Block 218, the process continues to Block 220, where the Stability Counter is incremented by 1. If the Stability Counter is greater than the Stability Value at Block 218, then the Stability Counter is reset to zero and a Signal Stability Flag is set to Stable at Block 222. In other words, when the Stability Counter exceeds the predetermined Stability Value, the signal from sensor 26 is determined to be "stable" at Block 222. By resetting the Stability Counter to zero at block 222, controller 24 is illustratively configured to periodically reset the Signal Stability Flag whenever the Stability Counter again exceeds the Stability Value, thereby continuously monitoring the stability of the signal.

If the calculated signal change (SignalChange) exceeds the noise limit (NoiseMaxThreshold) at Block 216, the signal from sensor 26 is determined to be noisy at Block 224, i.e., motion is detected in detection zone 27. Controller 24 sets the Signal Stability Flag to "Noisy" at Block 224. In addition, the Stability Counter is reset to zero to restart the signal stability determination, and a Noisy Counter is incremented by 1. The Noisy Counter illustratively counts the number of consecutive instances that the signal change (SignalChange) between the previous two rolling average measurements (PrevAvgData and AvgData) falls outside the predefined noise threshold (NoiseMaxThreshold). In one embodiment, controller 24 monitors the duration that the signal from sensor 26 is identified as "noisy" based on the Noisy Counter.

In addition to determining the stability of the signal from sensor 26, controller 24 also detects the presence of an object in detection zone 27 by comparing the capacitance level from sensor 26 to threshold values. When the detected capacitance level reaches or crosses a threshold level, an object is determined to be present in detection zone 27. Referring to FIG. 3A, if valve 22 is currently closed at Block 226 to block fluid flow, controller 24 compares the averaged data (AvgData) obtained at Block 212 to an open or "on" threshold value (OpenThreshold), as illustrated at Block 228. If the averaged data (AvgData) is greater than the open threshold value (OpenThreshold), controller 24 sets the Object Present Flag to "true" to indicate that an object is detected in detection zone 27. If the averaged data (AvgData) is less than or equal to the open threshold value (OpenThreshold), the Object Present Flag is set to "false" to indicate that an object is not detected in detection zone 27. As such, when the capacitance level detected with sensor 26 exceeds the predetermined threshold (OpenThreshold) and valve 22 is closed, controller 24 determines that an object, such as a user's hand, is in detection zone 27.

Similarly, if valve 22 is currently open at Block 230, controller 24 compares the averaged data (AvgData) from sensor 26 to a close or "off" threshold value (CloseThreshold), as illustrated at Block 232. If the averaged data (AvgData) is less than the close threshold value (CloseThreshold) at Block 232, the Object Present Flag is set to "false" at Block 236 to indicate that an object is not detected in detection zone 27. If the averaged data (AvgData) is greater than or equal to the close threshold value (CloseThreshold) at Block 232, the Object Present Flag is set to "true" at Block 240 to indicate that an object is detected in detection zone 27. As such, once valve 22 is open, controller 24 sets a flag (Object Present Flag) indicating that an object, such as a user's hand, is in detection zone 27 when the capacitance level detected with sensor 26 exceeds the predetermined threshold (CloseThreshold). In the illustrated embodiment, the open and close thresholds at Blocks 228 and 232 are predetermined count values.

Figure 4:
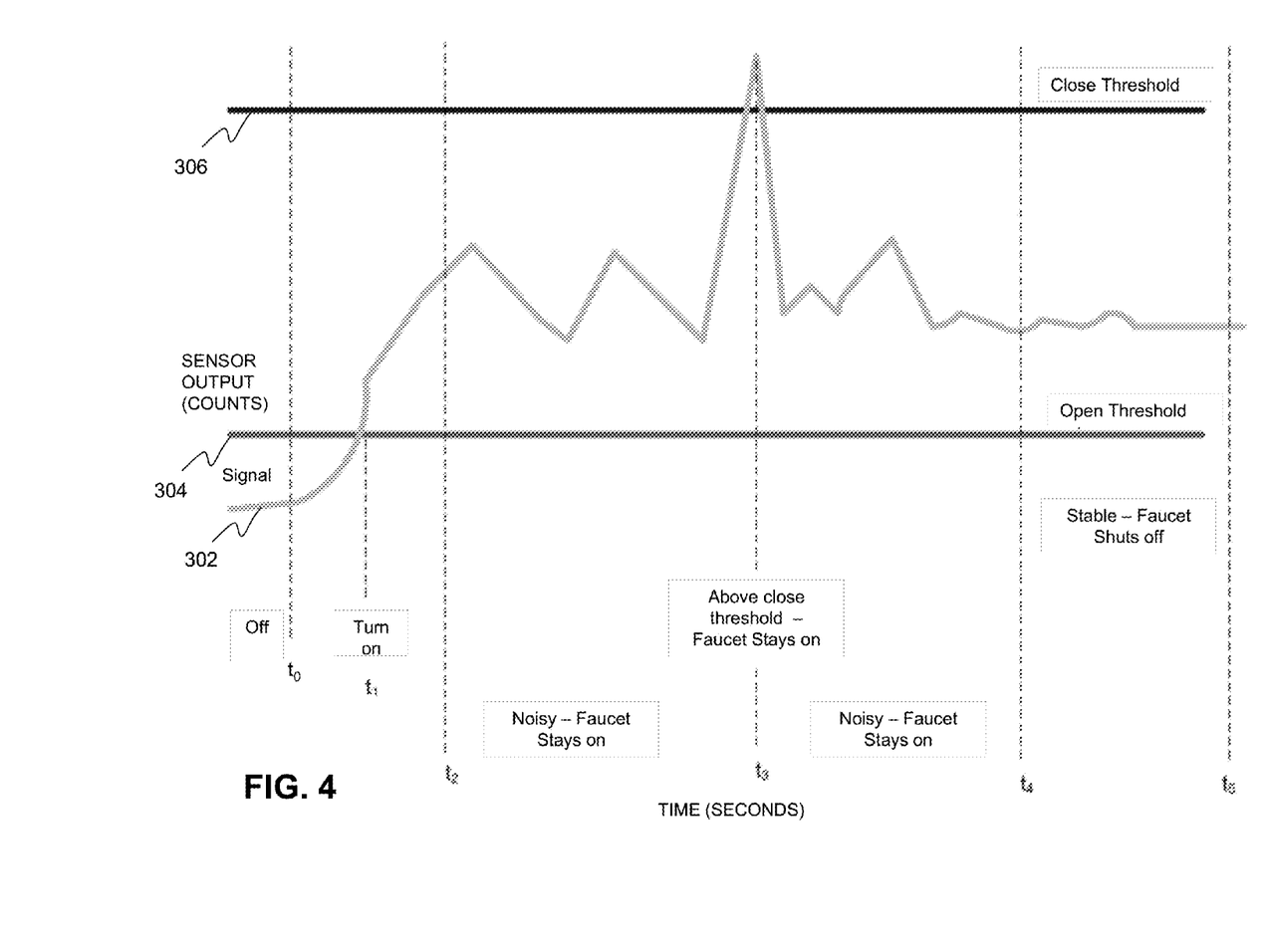
FIG. 4 is a graph of an exemplary output signal of the capacitive sensor of FIG. 1 illustrating changes in the output signal upon the detection of an object moving in a detection zone of the capacitive sensor.

In the illustrative embodiment of FIGS. 3A and 4, an object is considered to be present in detection zone 27 if the magnitude of the signal from sensor 26 (e.g., signal 302 of FIG. 4) is greater than the open or "on" threshold (OpenThreshold of FIG. 3A, line 304 of FIG. 4) when valve 22 is closed or when the magnitude of the signal is greater than the close or "off" threshold (CloseThreshold of FIG. 3A, line 306 of FIG. 4) when valve 22 is open. In the illustrated embodiment, the threshold value to keep valve 22 open (CloseThreshold) is greater than the threshold value to open valve 22 when valve 22 is closed (OpenThreshold). As described herein, the stability of the signal from sensor 26, in addition to the CloseThreshold, is further considered in determining when to close valve 22.

The CloseThreshold and OpenThreshold are illustratively count values that correspond to capacitance levels detected with sensor 26. As described herein, the CloseThreshold and OpenThreshold are illustratively determined based on the steady state capacitance signal provided with sensor 26. For example, the CloseThreshold and OpenThreshold are adjusted continuously or periodically based on the detected capacitance level when valve 22 is closed and when the capacitance signal is determined to be "stable," as described herein. In one exemplary embodiment, the CloseThreshold is about 100 counts greater in value than the OpenThreshold, although other suitable differences may be provided between CloseThreshold and OpenThreshold. An exemplary OpenThreshold is about 350 counts, and an exemplary CloseThreshold is about 450 counts. In one embodiment, the OpenThreshold is set to differ from the steady state capacitance signal by a predetermined count value. For example, the OpenThreshold may be set to 50 counts greater than the capacitance level detected with sensor 26 when faucet 10 is in a steady state condition. Alternatively, the OpenThreshold may be set to deviate from the steady state capacitance signal by a predetermined percentage, and the CloseThreshold may be set to deviate from the OpenThreshold by a predetermined percentage.

In one embodiment, the OpenThreshold includes a first predetermined range of values, and the CloseThreshold includes a second predetermined range of values. As such, controller 24 compares a measure of the signal provided with sensor 26 with each range of values to determine if an object is detected in detection area 27 and to determine when to open/close valve 22. For example, at block 228, if the averaged data (AvgData) falls outside the first predetermined range, controller 24 sets the Object Present Flag to "true" at block 234. If the averaged data (AvgData) falls within the first predetermined range, the Object Present Flag is set to "false" at block 238. Similarly, at block 232, if the averaged data (AvgData) falls outside a second predetermined range, controller 24 sets the Object Present Flag to "true" at block 240. If the averaged data (AvgData) falls within the second predetermined range, the Object Present Flag is set to "false" at block 236. In one embodiment, the second predetermined range of values of the CloseThreshold is greater than the first predetermined range of values of the OpenThreshold. Further, the first and second predetermined ranges illustratively include count values representative of a measure of capacitance. For example, the first predetermined range of the OpenThreshold includes count values between zero and a first threshold count value, the second predetermined range of the CloseThreshold includes count values between zero and a second threshold count value, and the second threshold count value is greater than the first threshold count value. In one embodiment, the second threshold count value is about 100 counts greater than the first threshold count value. Other suitable predetermined ranges and other differences between the first and second threshold count values may be provided.

With reference to FIGS. 2 and 3B, the illustrative method 200 continues at the Criteria to Change Threshold functional block 250. As described herein, controller 24 is configured to modify the on/off thresholds (OpenThreshold and CloseThreshold) of valve 22 if the signal from sensor 26 is stable and valve 22 is closed, i.e., when faucet 10 is in a steady state condition. In one embodiment, controller 24 modifies the on/off thresholds due to a change in the environmental conditions of faucet 10, such as a buildup of soap scum on faucet 10 or the presence of a soap dish or other objects near faucet 10, for example, that affect the capacitance level detected with sensor 26. For example, a buildup of soap on the faucet 10 or the presence of a soap dish near faucet 10 may cause the capacitance level detected with sensor 26 to increase or decrease regardless of the presence of a user's hands in detection zone 27. As such, a stable signal from sensor 26 may have an increased or decreased magnitude due to the environmental changes of faucet 10. In the illustrated embodiment, controller 24 is configured to adjust the on/off thresholds based on the detected steady state signal from sensor 26 and at least one predefined offset, as described herein.

Referring to Block 252 of FIG. 3B, if the signal from sensor 26 is determined to be stable (based on the Signal Stability Flag) and valve 22 is closed, controller 24 determines that faucet 10 is in a steady state condition and proceeds to blocks 254, 256, and 258 to modify the on/off thresholds. Controller 24 may alternatively be configured to modify the on/off thresholds under other conditions, such as when valve 22 is open, for example. As described herein, the on/off thresholds are modified by adding an offset to each threshold. In one embodiment, the offset(s) are predetermined and stored in the memory of controller 24. In another embodiment, the offset(s) are adjusted automatically with controller 24 or manually based on the environmental conditions of faucet 10.

At Block 254, controller 24 acquires new data, i.e., a new capacitance measurement/sample, from capacitance sensor 26. In the illustrated embodiment, the new data acquired at Block 254 is the same new data acquired at Block 212 of FIG. 3A, although additional new data may be acquired. As with Block 212, the new data from sensor 26 is averaged with previously acquired data from sensor 26 to generate a rolling average of data from sensor 26 (AvgData) at Block 254. The previously acquired data includes one or more immediately preceding measurement/samples from sensor 26. In the illustrated embodiment, the rolling average AvgData calculated at Block 254 is the same rolling average AvgData calculated at Block 212.

At Blocks 256 and 258, the on/off thresholds for valve 22 are modified. At Block 256, the open or "on" threshold OpenThreshold is set to the sum of the calculated rolling average (AvgData) and a first predetermined offset (First Offset). At Block 258, the close or "off" threshold is set to sum of the modified OpenThreshold and a second predetermined offset (Second Offset). As such, the First Offset represents the difference between the detected average capacitance level (AvgData) and the OpenThreshold, and the Second Offset represents the difference between the OpenThreshold and the CloseThreshold. In one embodiment, the offset valves (First Offset and Second Offset) are determined during periodic system calibrations and are stored in the memory accessible by controller 24. In one exemplary embodiment, the Second Offset is equal to about 100 counts, as described herein, although other values of the Second Offset may be provided for setting the difference between CloseThreshold and OpenThreshold. In the illustrated embodiment, the Second Offset is greater than the First Offset, although the Second Offset may alternatively be less than or equal to the First Offset. Exemplary values of First Offset are 20 counts, 50 counts, or 75 counts, although other suitable values may be provided for the First Offset.

Following the Criteria to Change Thresholds functional block 250, method 200 proceeds to the Criteria to Turn On the Valve functional block 260 to set a flag for turning on or opening valve 22 when an object is detected in detection zone 27. Referring to Block 262 of FIG. 3B, controller 24 determines if an object is present based on the Object Present Flag set at functional block 210 of FIG. 3A, i.e., based upon AvgData being greater than the OpenThreshold at Block 228 or the CloseThreshold at Block 232. If an object is present based on the Object Present Flag and valve 22 is currently closed, controller 24 sets an OpenFlag to "true" at Block 264 of FIG. 3C.

If an object is determined to be not present based on the Object Present Flag or if valve 22 is currently open at Block 262, controller 24 proceeds to the Criteria to Turn Off the Valve functional block 270 of FIG. 3C to determine whether to close valve 22. At functional block 270, controller 24 is configured to set a flag to close valve 22 if the valve 22 is open, the signal from sensor 26 is stable, and an object is not detected in detection zone 27. As such, if valve 22 is open and the signal from sensor 26 is determined to be "noisy," controller 24 illustratively does not close valve 22 even if an object is not detected in detection zone 27. In particular, if valve 22 is open and the signal from sensor 26 is stable (based on the Signal Stability Flag) at Block 272, controller 24 determines if an object is present based on the Object Present Flag set at functional block 210. If an object is determined to not be present in detection zone 27 based on the Object Present Flag (i.e., based upon AvgData being less than the CloseThreshold at Block 232 or the OpenThreshold at Block 228), and if the signal from sensor 26 is "stable" and valve 22 is open, controller 24 sets a CloseFlag to "true" at Block 274 of FIG. 3C.

Following functional blocks 260 and 270 of FIG. 3C, method 200 continues to the Valve Handler functional block 280 illustrated in FIGS. 2 and 3C to either open or close valve 22. More particularly, controller 24 opens valve 22 at Block 282 upon the OpenFlag being set to "true" at Block 264. Similarly, controller 24 closes valve 22 at Block 282 upon the CloseFlag being set to "true" at Block 274.

FIG. 4 illustrates a representative capacitive sensing signal 302 received by controller 24 from capacitive sensor 26. The signal 302 is plotted such that time (illustratively in seconds) is represented in the horizontal direction (X axis) and the sensor output (illustratively in counts) is represented in the vertical direction (Y axis). The open or "on" threshold (OpenThreshold) is represented by line 304, and the close or "off" threshold (CloseThreshold) is represented by line 306. As illustrated, close threshold 306 is positioned above the open threshold 304, indicating that valve 22 is configured to close at a greater magnitude of signal 302 than the magnitude of signal 302 required to open valve 22. As such, the close threshold 306 requires the user to be closer, and in some cases touching, faucet 10 in order for signal 302 to stay above the close threshold 306. As described herein, the open and close thresholds 304, 306 are dynamically changed by controller 24 based on the environmental conditions of faucet 10.

Referring to FIG. 4, capacitance signal 302 is below the open threshold 304 between times $t_0$ and $t_1$, indicating that an object is not detected in detection zone 27. As such, valve 22 of faucet 10 is closed. At time $t_1$, signal 302 exceeds the open threshold 304, indicating that an object is detected in detection zone. As such, valve 22 is opened at time $t_1$ to supply water to spout 12. Between times $t_2$ and $t_3$, controller 24 determines that the signal is "noisy" (e.g., object moving in the detection zone) based on functional block 210 of the method 200 described herein. Since signal 302 is above the open threshold 304 and noisy, valve 22 remains open despite signal 302 being below the close threshold 306. At time $t_3$, signal 302 exceeds the close threshold 306, and thus valve 22 remains open regardless of whether signal 302 is noisy or stable. For example, signal 302 may exceed the close threshold 306 when the user touches spout 12. Between times $t_3$ and $t_4$, signal 302 is again above the open threshold 304 but below the close threshold 306. Valve 22 remains open between times $t_3$ and $t_4$ because controller 24 determines the signal 302 to be noisy. Beginning at time $t_4$, signal 302 remains below the close threshold 306, but controller 24 determines signal 302 to be stable. As such, controller 24 closes valve 22 at time $t_4$ to block water from flowing through spout 12 due to signal 302 being both stable and less than the close threshold 306.

U.S. Pat. No. 8,944,105, U.S. Pat. No. 8,613,419, and U.S. Pat. No. 8,561,626, are expressly incorporated by reference herein.

Although the invention has been described in detail with reference to certain preferred embodiments, variations and modifications exist within the spirit and scope of the invention as described and defined in the following claims.

The invention claimed is:

1. A method of controlling an electronic faucet, the method comprising the steps of:
   providing a faucet including a spout having a passageway configured to deliver fluid through the spout, a valve positioned in the passageway, and a capacitive sensor coupled to the faucet and defining a detection area;
   positioning the valve in an open position;
   detecting movement of an object in the detection area based on a capacitive signal provided with the capacitive sensor; and
   maintaining the valve in the open position when the movement of the object is detected in the detection area wherein the valve is positioned in the open position upon a measure of the capacitive signal provided with the capacitive sensor reaching a threshold value.

2. The method of claim 1, further including the step of closing the valve when substantially no movement of the object is detected in the detection area and the measure of the capacitive signal is less than a second threshold value, the second threshold value being greater than the threshold value.

3. The method of claim 1, wherein the movement of the object is detected based on a variation of the capacitive signal provided with the sensor being outside a predetermined range.

4. The method of claim 3, wherein the predetermined range is between about a zero percent variation and about a 20 percent variation.

5. An electronic faucet comprising:
   a spout having a passageway configured to deliver fluid through the spout;
   an electrically operable valve positioned in the passageway;
   a capacitive sensor coupled to the faucet and defining a detection area; and
   a controller in electrical communication with the capacitive sensor, wherein the controller defines a threshold, the capacitive sensor is configured to send a capacitive signal to the controller, and the controller opens the valve when a measure of the capacitive signal reaches the threshold, and the controller is configured to maintain the valve in an open position when an object is moving within the detection area.

6. The faucet of claim 5, wherein the controller is configured to adjust the threshold in response to at least one environmental factor.

7. The faucet of claim 5, wherein the controller defines a first threshold and a second threshold greater than the first threshold, and the controller is configured to open the valve when the measure of the capacitive signal exceeds the first threshold.

8. The faucet of claim 7, wherein the controller is configured to maintain the valve in the open position when the measure of the capacitive signal exceeds the second threshold.

9. The faucet of claim 7, wherein the controller is configured to close the valve when substantially no movement of the object is detected within the detection area and the measure of the capacitive signal is less than the second threshold.

10. The faucet of claim 5, wherein the controller is configured to detect a movement of the object within the detection area based on a variation of the capacitive signal being outside a predetermined range.

11. The faucet of claim 10, wherein the predetermined range is between about a zero percent variation and about a 20 percent variation.

12. The faucet of claim 5, wherein the electrically operable valve comprises a solenoid valve.

13. An electronic faucet comprising:
   a spout having a passageway configured to deliver fluid through the spout;
   an electrically operable valve positioned in the passageway;
   a capacitive sensor coupled to the faucet and defining a detection area;
   a controller in electrical communication with the capacitive sensor and defining an open threshold and a close threshold greater than the open threshold, the capacitive sensor being configured to send a capacitive signal to the controller;

the controller being configured to move the valve to an open position when a measure of the capacitive signal exceeds the open threshold;

the controller being configured to maintain the valve in the open position when the measure of the capacitive signal exceeds the close threshold; and the controller being configured to maintain the valve in the open position when the measure of the capacitive signal exceeds the open threshold and an object is moving within the detection area.

14. The faucet of claim 13, wherein the controller is configured to close the valve when substantially no movement of the object is detected within the detection area and the measure of the capacitive signal is less than the close threshold.

15. The faucet of claim 14, wherein the controller is configured to detect a movement of the object within the detection area based on a variation of the capacitive signal being outside a predetermined range.

16. The faucet of claim 15, wherein the predetermined range is between about a zero percent variation and about a 20 percent variation.

* * * * *